United States Patent
Bauer et al.

(10) Patent No.: US 9,908,400 B2
(45) Date of Patent: Mar. 6, 2018

(54) METHOD OF USING A CONTAINER FOR A REFRIGERATED FLUID, AND A CORRESPONDING CONTAINER

(75) Inventors: Michael Bauer, Unterfoehring (DE); Torsten Franke, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 1714 days.

(21) Appl. No.: 13/418,020

(22) Filed: Mar. 12, 2012

(65) Prior Publication Data
US 2012/0169299 A1    Jul. 5, 2012

Related U.S. Application Data

(63) Continuation of application No. PCT/EP2010/062904, filed on Sep. 2, 2010.

(30) Foreign Application Priority Data

Oct. 10, 2009    (DE) .................. 10 2009 049 022

(51) Int. Cl.
  *H01G 11/28*    (2013.01)
  *B60K 15/03*    (2006.01)

(52) U.S. Cl.
  CPC .............. *B60K 15/03006* (2013.01); *F17C 2203/0391* (2013.01); *F17C 2203/0629* (2013.01);
  (Continued)

(58) Field of Classification Search
  CPC ........... H01G 9/12; H01G 9/14; H01G 9/145; H01G 11/04; H01G 11/28; H01G 11/32; H01G 11/42; H01G 11/66
  (Continued)

(56) References Cited

U.S. PATENT DOCUMENTS 5,898,561 A * 4/1999 Mandelcorn ............. H01G 4/12
  29/25.42
7,126,810 B1 * 10/2006 Mueller .................... H01G 9/14
  361/227
(Continued)

FOREIGN PATENT DOCUMENTS

DE    41 16 066 A1    11/1992
DE    100 55 104 C1    2/2002
(Continued)

OTHER PUBLICATIONS

German Search Report dated Dec. 27, 2010 including partial English-language translation (Nine (9) pages).
(Continued)

*Primary Examiner* — Nguyen Ha
(74) *Attorney, Agent, or Firm* — Crowell & Moring LLP

(57) ABSTRACT

A container for a refrigerated fluid having an external container and an internal container between which an evacuated intermediate space is situated, which contains a super-insulator formed by several, separated layers of foil provided with a metal layer, is used as a storing device for electric energy. The foils act as foil capacitors and are electrically contacted so that an electric voltage can be applied to corresponding electric terminals on the exterior side of the container. In the container, a metal layer can be provided on both surfaces of the foil(s), and the foil(s) may consist of a material with a semiconductor characteristic. The foil capacitors are electrically connectable in series or parallel, and the electrical contacting of the foil metal surfaces can take place via a suspension structure of the internal container in the external container.

15 Claims, 2 Drawing Sheets

(52) U.S. Cl.
CPC .............. *F17C 2221/012* (2013.01); *F17C 2223/0161* (2013.01); *F17C 2223/033* (2013.01); *F17C 2260/033* (2013.01); *F17C 2270/0168* (2013.01); *Y02E 60/321* (2013.01)

(58) Field of Classification Search
USPC ............... 361/509–512, 516–519, 525–529
See application file for complete search history.

(56) References Cited

U.S. PATENT DOCUMENTS

| | | |
|---|---|---|
| 2002/0053368 A1 | 5/2002 | Blaszczyk et al. |
| 2004/0138066 A1 | 7/2004 | Sinha et al. |
| 2004/0250551 A1* | 12/2004 | Schnagl ............... F17C 3/00 62/45.1 |
| 2005/0077300 A1 | 4/2005 | Hafellner et al. |
| 2006/0124973 A1* | 6/2006 | Arai ................... B60K 6/28 257/223 |
| 2006/0196876 A1 | 9/2006 | Rohwer |

FOREIGN PATENT DOCUMENTS

| | | |
|---|---|---|
| DE | 103 45 958 A1 | 4/2005 |
| DE | 10 2005 014 479 A1 | 10/2006 |
| DE | 10 2006 057 663 A1 | 6/2008 |
| DE | 10 2006 009 061 B4 | 7/2008 |
| GB | 2 318 861 A | 5/1998 |
| JP | 2008-285113 A | 11/2008 |
| WO | WO 03/104599 A1 | 12/2003 |
| WO | WO 2009/075877 A1 | 6/2009 |

OTHER PUBLICATIONS

International Search Report dated Oct. 29, 2010 including English-language translation (Six (6) pages).

* cited by examiner

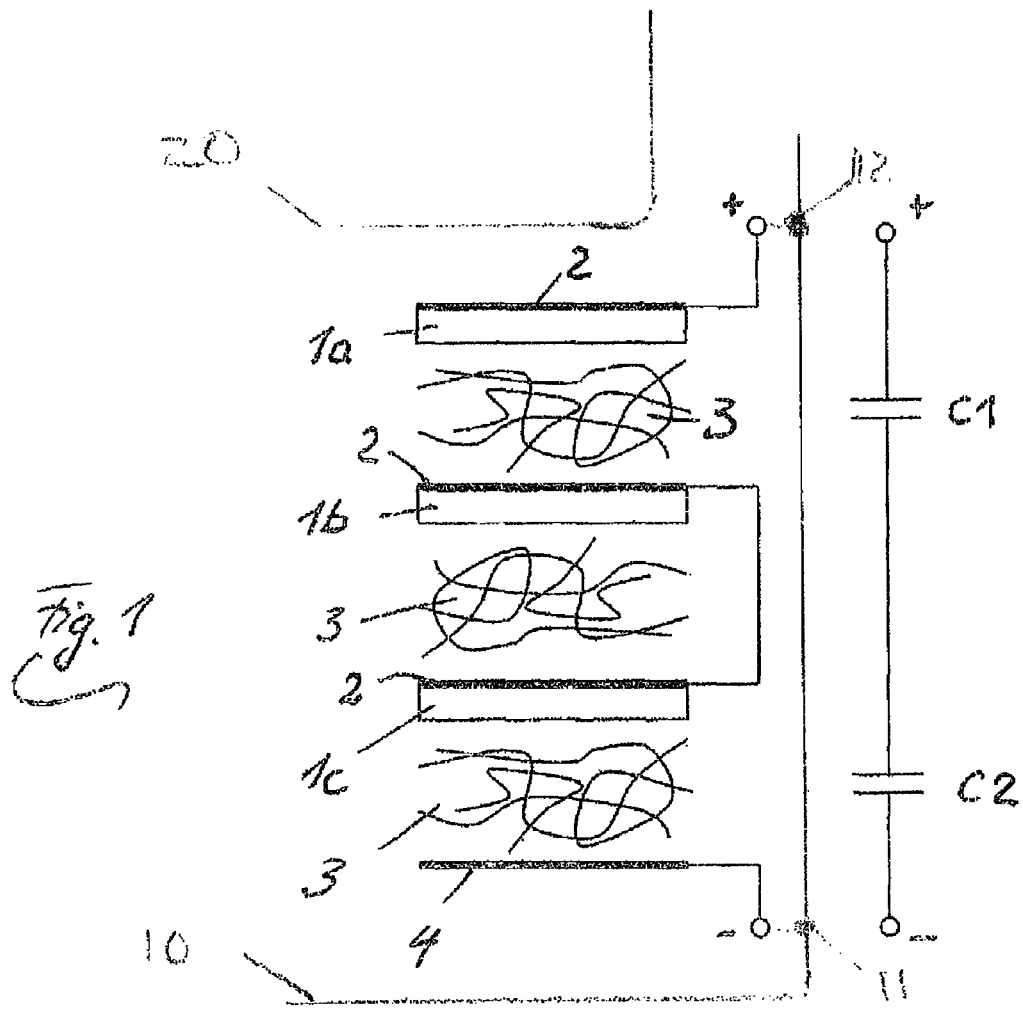
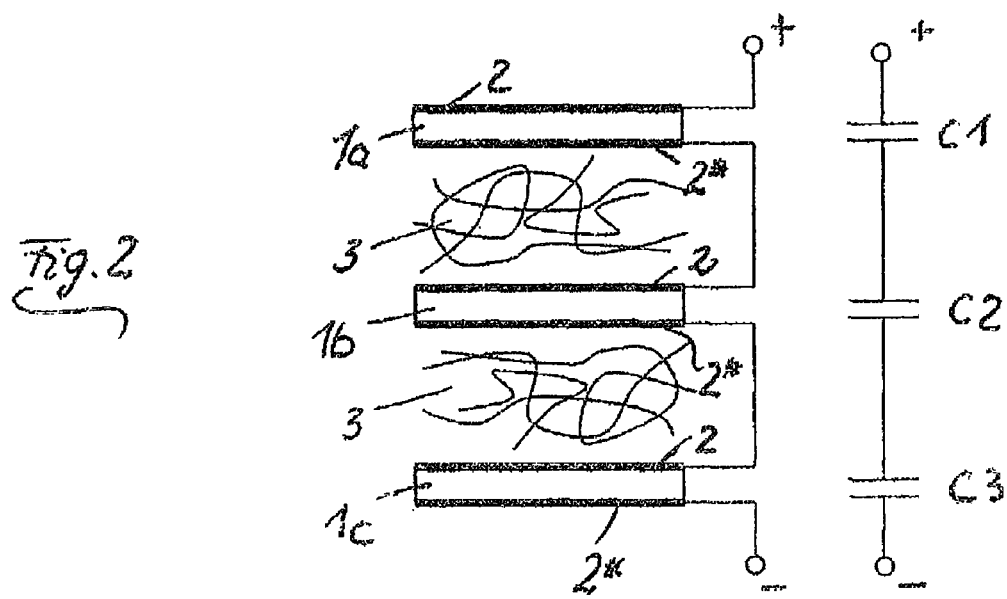

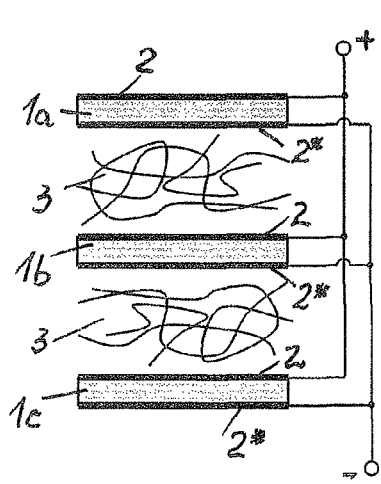
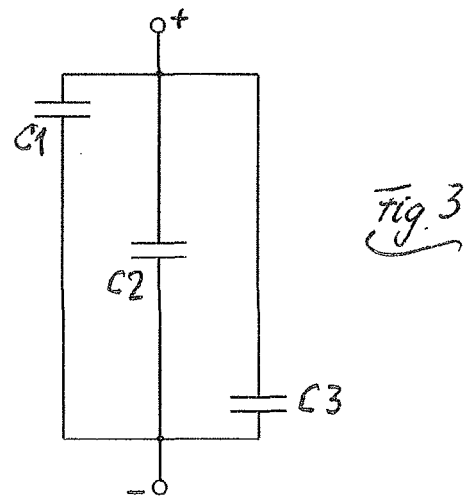
Fig. 3
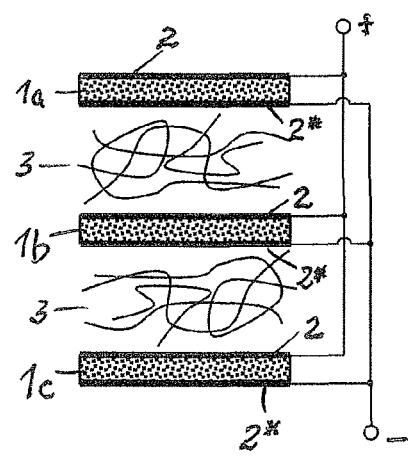
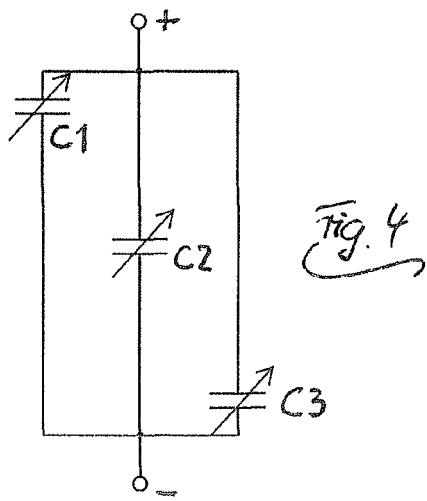
Fig. 4

METHOD OF USING A CONTAINER FOR A REFRIGERATED FLUID, AND A CORRESPONDING CONTAINER

CROSS-REFERENCE TO RELATED APPLICATIONS

This application is a continuation of PCT International Application No. PCT/EP2010/062904, filed Sep. 2, 2010, which claims priority under 35 U.S.C. § 119 from German Patent Application No. DE 10 2009 049 022.1, filed Oct. 10, 2009, the entire disclosures of which are herein expressly incorporated by reference.

BACKGROUND AND SUMMARY OF THE INVENTION

The invention relates to a method of using a container for a refrigerated fluid having an external container and an internal container, between which an evacuated intermediate space is situated which contains a superinsulating means, and wherein the superinsulating means is formed by several layers of foil provided with a metal layer, which foils are preferably separated from one another by spacers, preferably in the form of an insulating material, as well as to a corresponding container.

With respect to the state of the art, reference is made as an example to German Patent document DE 10 2005 014 479 A1 and also to the basically known electric synthetic foil capacitors (in the following, called foil capacitors). These are electric capacitors having insulating synthetic foils as a dielectric, in the case of which thin foils are equipped with the electrodes and are then joined as wraps or as individual layers for forming a capacitor (definition from "Wikipedia").

A container, as indicated above, can be used as a tank for cryogenic hydrogen in a motor vehicle, which carries this hydrogen as fuel for preferably supplying the vehicle drive unit. Such future motor vehicles may also have a hybrid drive; i.e. can optionally or also additionally be driven by an electric motor, in which case an accumulator for electric energy is to be provided. However, electric energy is also used in a motor vehicle for supplying ancillary equipment and for this purpose also has to be stored in an appropriate fashion.

By way of the present invention, a particularly advantageous electric energy storage device was found for a vehicle that is equipped with a container as initially discussed above; i.e., with a container for a refrigerated fluid having an external container and an internal container, between which an evacuated intermediate space is situated which contains a superinsulator, and in which case the superinsulator is formed by several layers of foil provided with a metal layer, which foils are separated from one another by spacers, preferably in the form of an insulating material. Specifically, this container is therefore used as a storage device for electric energy in that the foils act as foil capacitor(s) and, for this purpose, are appropriately electrically contacted, so that an electric voltage can be applied to corresponding electric terminals on the exterior side of this container.

By means of the present invention, a particularly advantageous combination of functions is indicated in that the container for storing the fuel (in the form of cryogenic hydrogen) can simultaneously be used with relatively few changes or additional measures as a storage device for electric energy. Specifically, it was discovered that the foils, which are provided as a superinsulator in the container and which, in particular, are coated with a metal for forming a reflection layer, can simultaneously form a (basically known) foil capacitor.

In this case, the electric charge supplied by way of suitable electric terminals can be stored in the metallic coating of the foils. The foils will then operate as electrodes of the capacitor, while either the foils alone or the foil together with the spacers or the insulation layer and the vacuum between the internal container and external container act as the dielectric of the capacitor or of several individual capacitors formed by the plurality of foil layers. The individual capacitors are suitably connected together to form a sum capacitance which, in the present case, should also be included under the term "foil capacitor". As far as the above-mentioned sum connection is concerned, this may be a series or a parallel connection. If, in this case, the foils are provided with a metallic layer only on one side—for reasons of weight and cost, preferably on an aluminum base-, the spacers or the insulating layer as well as the vacuum between mutually adjacent foils are necessarily a component of the dielectric of the capacitor. If both surfaces of the foil(s) are provided with a metal layer, depending on the electric interconnection of several foils, either only the electric foil itself or the foils together with the spacers or the insulation layers and the vacuum form the dielectric. Here, it is again pointed out that, in the known state of the art, the above-mentioned foils are, among other things, already metallically coated on one side for forming a reflection layer for heat radiation. In this context, the so-called biaxially oriented polyester films ("boPET") should be mentioned, which are sold, for example, by the "Mylar" trade name and can be coated with aluminum by sputtering. According to "Wikipedia", such films are currently already used in foil capacitors.

Although, in the case of the so-called cryotanks for passenger cars currently being produced in small series, approximately 50 to 70 foil layers are provided, so that the latter describe a total surface of approximately 100 square meters and therefore supply the thermal insulating space between the external container and the internal container by means of the present invention for an additional utilization as an electric energy storage device of a charging capacitance that should not be neglected, this capacitance or the electric capacitance of a foil capacitor according to the invention as a whole can be further increased particularly at a relatively low electric voltage if the foil(s) consist(s) of a semiconductor material. Polyacetylene or PTCDA (3,4,9,10 perylene tetra carboxylic acid dianhydride), for example, have such an electric semiconductor characteristic. By use of such materials, a quasi-formation of a pn-diode, a pin-diode or a Schottky diode then becomes possible, which each represent an electric capacitance.

Also for the purpose of an advantageous combination of functions, the electrical contacting of the metal layers of the foils can take place by way of the suspension structure of the internal container in the external container, in which case this suspension structure known to a person skilled in the art can either carry suitable electric conductors or can at least in sections itself, represent these conductors.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 is a schematic view of, on a left side thereof, a first exemplary embodiment of three foils having a metal layer having a particular electrical coupling illustrated via a circuit on the right half of the figure;

FIG. 2 is a schematic view of, on a left side thereof, a second exemplary embodiment of three foils having a metal layer having a particular electrical coupling illustrated via a circuit on the right half of the figure;

FIG. 3 is a schematic view of, on a left side thereof, a third exemplary embodiment of three foils having a metal layer having a particular electrical coupling illustrated via a circuit on the right half of the figure; and FIG. 4 is a schematic view of, on a left side thereof, a fourth exemplary embodiment of three foils having a metal layer having a particular electrical coupling illustrated via a circuit on the right half of the figure.

DETAILED DESCRIPTION OF THE DRAWINGS

The left half of the attached FIGS. 1-4, in each case, contains abstract views of three foils having a metal layer, which foils are arranged above one another with the intermediate insert of an insulating material acting as a spacer. The foils are electrically connected with one another such that, as a result, an interconnection of electric capacitors is formed, which capacitors are each illustrated in the right half of the figure in the form of a conventional electric circuit diagram. In all figures, identical elements have the same reference numbers.

Thus, reference numbers 1a, 1b, 1c illustrate the above-mentioned three foils arranged above one another, which are a component of a stack of foils provided as a "superinsulator" in the vacuum space between an internal container and external container of a so-called cryotank (schematically illustrated in FIG. 1 by exterior wall portion 10 with electric terminals 11, 12 and interior wall portion 20), as shown, for example, in the above-mentioned German Patent document DE 10 2005 014 479 A1. Each foil is provided at least on one side, i.e. on one of its two surfaces, with a metal layer 2, i.e. metallically coated, for example, with aluminum. In the case of a two-sided coating, the second metal layer has the reference number 2*. An insulating material 3 is provided in each case between two foils 1a, 1b or 1b, 1c situated above one another, which insulating material acts as a spacer, for which the reference number 3 is also used.

An electrical contact is provided on each metal layer 2, 2*, and in the different embodiments, these electrical contactings are connected with one another in different fashions by way of electrical conductors (not provided with a reference number but illustrated as lines) such that, as a result, electric capacitors Cx (x=1, 2, 3, ...) in a different circuit arrangement are formed whose electrodes are finally connected with the positive pole (+) or the negative pole (−) of a voltage source.

In the embodiment according to FIG. 1, each foil 1a, 1b, 1c is provided with a metal layer only on one side, so that two mutually adjacent foils 1a, 1b metallically coated on one side form a first capacitor C1. In view of the fact that only three foils are present, for forming a second capacitor C2, in addition to the third foil 1c, an auxiliary electrode 4 is provided here. These two capacitors C1, C2 are then connected in series.

In the further embodiments according to FIGS. 2, 3 and 4, each foil 1a, 1b, 1c is metallically coated on both sides; i.e. a metal layer 2 and 2*, respectively, is situated on each of the two foil surfaces. In this case, each foil 1a, 1b, 2c by itself forms an electric capacitor C1, C2 and C3, respectively. In the embodiment of FIG. 2, these three capacitors C1, C2, C3 are connected in series, while, in the embodiment according FIG. 3, they are in a parallel connection.

In the embodiment according to FIG. 4, the connection arrangement is as in FIG. 3, but in FIG. 4 each foil 1a, 1b, 1c consists of a material having the characteristic of an electric semiconductor.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A storage device for electric energy, comprising:
a container for a refrigerated fluid having an external container and an internal container between which an evacuated intermediate space is located;
a superinsulator formed by several foil layers, each having a metal layer, arranged in the intermediate space, the foil layers being separated from one another by spacers;
electrical contacts operatively configured with respect to the foil layers so as to form foil capacitors for storing electric energy; and
electric terminals on an exterior side of the container for applying electric voltage to store the electric energy.

2. The storage device according to claim 1, wherein both sides of each foil have a metal layer.

3. The storage device according to claim 2, wherein at least one foil comprises a material having semiconductor characteristics.

4. The storage device according to claim 1, wherein at least one foil comprises a material having semiconductor characteristics.

5. The storage device according to claim 1, wherein the foil capacitors formed by the foil layers are electrically connected in series.

6. The storage device according to claim 1, wherein the foil capacitors formed by the foil layers are electrically connected in parallel.

7. The storage device according to claim 1, wherein the electrical contacts provided on the metal layers of the foils occur through a suspension structure for the internal container arranged inside the external container.

8. The storage device according to claim 1, wherein the spacers are formed of an insulating material.

9. The storage device according to claim 1, wherein the container is a cryotank storing cryogenic fluid.

10. A storage device for electric energy supplied to a vehicle, comprising:
a cryotank storing cryogenic fluid, the cryotank having an external container and an internal container with several foil layers provided in a space there between as a superinsulator;
wherein the foil layers are electrically coupled to form foil capacitors within the cryotank, the foil capacitors storing the electric energy.

11. The storage device according to claim 10, wherein each foil layer has a metal layer, the foil layers being separated by insulating spacers.

12. The storage device according to claim 10, wherein each foil layer has a metal layer arranged on both side surfaces.

13. The storage device according to claim 10, wherein the foil capacitors are electrically coupled in series.

14. The storage device according to claim 10, wherein the foil capacitors are electrically coupled in parallel.

15. The storage device according to claim 10, wherein the foil layers comprise a material having a characteristic of a semiconductor.

\* \* \* \* \*